Dec. 18, 1956  G. GILL ET AL  2,774,236
FOOD MIXING ATTACHMENT FOR DOMESTIC WASHING MACHINES
Filed April 21, 1954  3 Sheets-Sheet 2

INVENTORS.
George Gill.
Annie Kathleen Gill.
George Jeffrey Gill.

BY Richardson, David & Nydon
their ATTORNEYS.

Dec. 18, 1956     G. GILL ET AL     2,774,236
FOOD MIXING ATTACHMENT FOR DOMESTIC WASHING MACHINES
Filed April 21, 1954     3 Sheets-Sheet 3

INVENTORS.
George Gill.
Annie Kathleen Gill.
George Jeffrey Gill.
BY Richardson, David and Norton
their ATTORNEYS.

United States Patent Office 2,774,236
Patented Dec. 18, 1956

2,774,236

FOOD MIXING ATTACHMENT FOR DOMESTIC WASHING MACHINES

George Gill, Annie Kathleen Gill, and George Jeffrey Gill, Pudsey, near Leeds, England, assignors to Fisher & Ludlow Limited, Birmingham, England, a British company Application April 21, 1954, Serial No. 424,664

2 Claims. (Cl. 68—4)

This invention relates to domestic washing machines for washing clothes and like articles and or for washing dishes or other crockery, cutlery and similar household articles of the type comprising an outer stationary casing and a substantially vertically extending power driven driving element within the casing adapted to effect power rotation about a substantially vertical axis of a container or basket within the casing which receives the articles to be washed.

The present invention has for its object the provision for use with or in combination with a domestic washing machine of the foregoing type, of a new or improved form of appliance for use in the preparation of foodstuffs, thus increasing substantially the utility of the machine.

According to the present invention we provide for or in combination with a domestic washing machine of the above type, a food-stuffs preparation appliance of the known kind comprising a food-stuffs containing bowl, and a tool adapted to co-act therewith in performing a food-stuffs preparation operation, which appliance is characterised by the feature that the bowl is provided with a driving portion adapted for detachable engagement with the said power driven driving element of the washing machine so as to be rotated about a substantially vertical axis with the mouth of the bowl directed upwardly, the tool being connected to a supporting member adapted to be connected detachably to a stationary part of the machine so as to be supported therefrom in a position in which it extends above the level of the mouth of the bowl, with the tool depending from the supporting member into the interior of the bowl through the mouth thereof in a position for co-acting with the bowl for performing the food-stuffs preparation operation.

Such appliance may be employed, for example in the mixing of ingredients in connection with various culinary operations for example in mixing the ingredients for dough cakes and the like and may further be adapted for use in peeling scraping and cleaning operations on food stuffs such as for instance potatoes and other vegetables.

The bowl may be formed with a central tubular portion extending upwardly from its base and adapted to receive therewithin the upper portion of the said power driven driving element so that the bowl is provided with an annular mixing or other space in which the tool operates.

The tool may be carried from a supporting member so that the tool depends therefrom, and a pair of tools may be provided connected hingedly to opposite sides of the supporting member, one of which tools may serve for use in the mixing operation and the other of which tools may serve for use in the peeling or scraping operation, the arrangement being such that only one of the two tools is disposed within the bowl with the other in an out of use or inoperative position disposed above the supporting element and conveniently extending substantially parallel to the length thereof.

The invention is illustrated in the accompanying drawings wherein.

Figure 1:
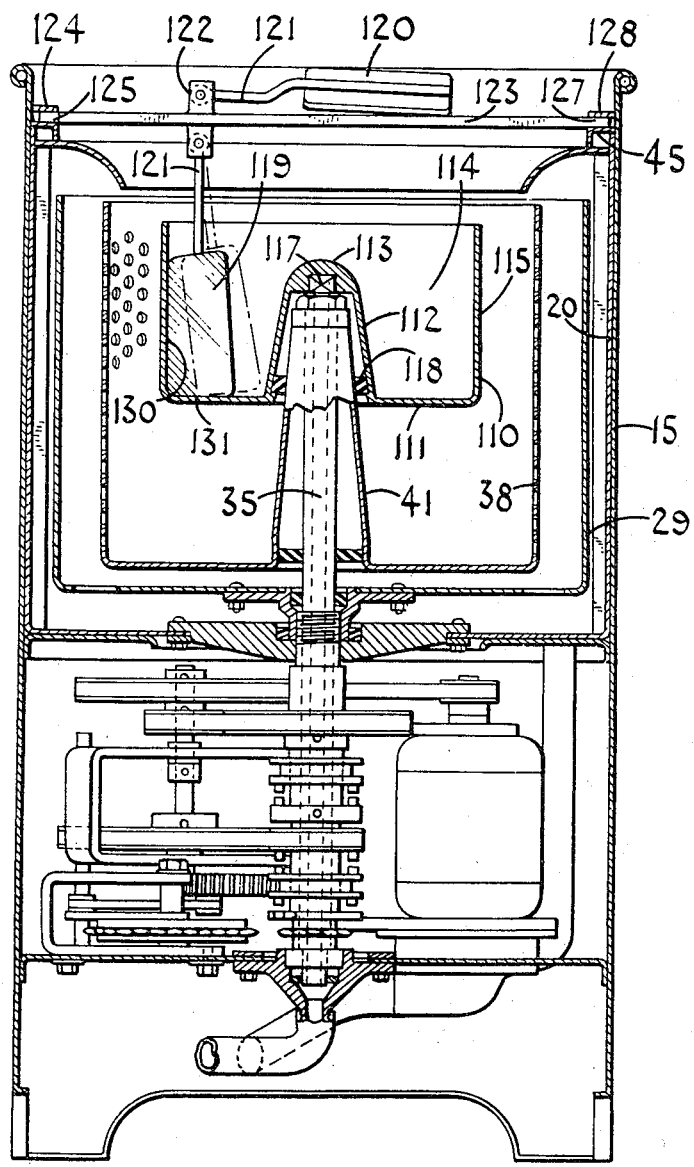
Figure 1 is a cross sectional side elevation of one form of domestic washing machine provided with a food-stuffs preparation appliance in accordance with this invention.

In the drawings, the invention is depicted as applied to a domestic washing machine comprising a stationary body 15, in the upper part of which is housed a stationary open mouthed casing 20, within the interior of which is disposed a container or basket 38 for the articles to be washed, between which container and the casing 20 is disposed an impeller element 29 adapted to be power rotated at a constant speed conveniently of the order of 120 R. P. M.

Figure 2:
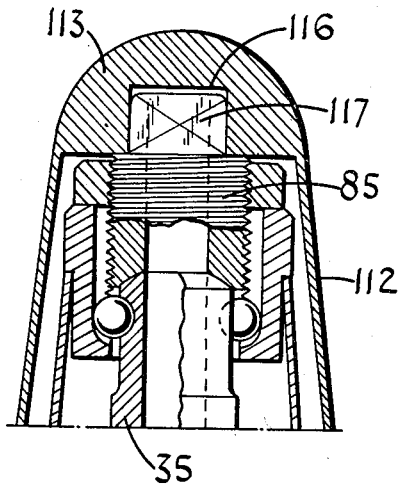
Figure 2 is a sectional view to an enlarged scale of part of the machine depicted in Figure 1 showing the manner in which the bowl of the foodstuffs appliance is directly connected to the power driven driving element of the washing machine.

The machine embodies a power driven driving element in the form of a vertically extending driving shaft 35 which through the medium of a coupling illustrated in Figure 2 serves to drive the container 38 through the medium a supporting sleeve 41 of generally frusto conically configuration rotating the driving shaft 35 at the same constant speed of rotation as that of the impeller element 29, namely 120 R. P. M. which is a speed convenient for performing a food-stuffs preparation for example a mixing operation.

Figure 3:
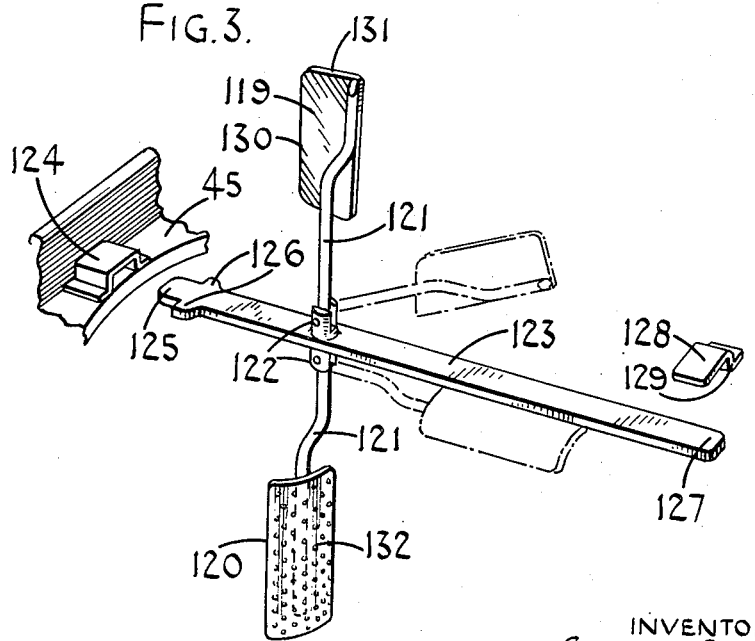
Figure 3 is a detached perspective view illustrating part of the appliance and its mode of connection to the machine.

The food-stuffs preparation appliance depicted in Figures 1 to 3 of the drawings comprises a mixing bowl 110 of generally cylindrical configuration, smooth on its interior faces; the bowl being conveniently formed of stainless steel or other non-corrodible material and its flat circular base 111 is formed centrally with an upstanding upwardly tapered tubular portion 112; the upper end of which is integrally closed by a domed top 113, the overall depth of this tubular portion including the top thereof being only a little less than the overall depth of the bowl itself whereby a mixing space of annular form indicated at 114 is provided between the tubular portion 112 and the cylindrical side wall 115 of the bowl.

The domed top as shown more particularly in Figure 2 of the drawings is provided with a driving portion in the form of a recess 116 of non-circular configuration adapted for detachable driving engagement with the correspondingly square shaped driving spigot 117 provided on the upper part of the threaded plug 85.

The interior of the tubular portion 112 of the mixing bowl has a diameter greater than that of the exterior of the coupling aforesaid and of the upper end of the supporting sleeve 41. Thus the mixing bowl 110 can very readily be mounted in the operative position depicted in Figure 1 by inserting it through the open mouths of the casing 20 and container 38; in which position the vertical central axis of the bowl is coincident with the vertical central axis of the container 38; the bowl being maintained in such aligned position by providing the interior of its tubular portion 112 with a rubber or other resilient locating ring 118 which engages detachably with the exterior of the supporting sleeve 41.

The appliance further comprises a pair of tools 119, 120, each of which tools are carried on the one end of a stem 121, the opposite end of each stem being pivoted about mutually parallel axes between pairs of lugs 122 disposed on opposite sides of a bar-like supporting member 123 as shown in Figure 3, the axes of pivoting being perpendicular to the length of the bar like member so that each tool can be swung between an inoperative position in which it extends parallel or substantially parallel to the length of the bar like member so as then to occupy the minimum of space, and an operative position in which it extends perpendicular to the length of such member so as to depend substantially vertically therefrom and project into the annular space 114.

The supporting member 123 is adapted to support one or the other of the two tools in such operative position by engaging detachably at each end thereof with a stationary part associated with the casing or body of the washing machine in a position in which the supporting member extends diametrically above the mouth of the casing.

For this purpose the machine is provided at one side thereof above the mouth of the casing with an attachment bracket 124 of inverted channel configuration, which as shown in Figure 3 is carried on the upper side of the stiffening ring 45.

One end 125 of the supporting member bar 123 is adapted to be inserted within the interior of the bracket 124 and is provided with a pair of oppositely directed ears 126, which engage with the adjacent end of the bracket so as thereby to assist in locating the supporting member against horizontal movement perpendicular to its length as well as to locate it against movement along its length towards the bracket.

The opposite end 127 of the supporting member is adapted to engage beneath the free end of a lug 128 mounted on the stiffening ring 45 at a position diametrically opposite to the bracket 124.

The arrangement is such that the supporting member can be positioned by first engaging the one end thereof with the bracket 124 and then sliding the opposite end beneath the lug 128 so as to be engaged closely between the under side of the lug and the upper side of the stiffening ring.

As the mixing bowl is always being rotated in one given direction, the reaction on the tool therein tends to turn the supporting member 123 in the same direction about a vertical axis, and the lug 128 is disposed with its free end projecting opposite to the direction in which the end 127 of the supporting member tends thereby to turn, so that in operation this end always bears against the cranked portion 129 of this lug and is maintained in situ.

The tool 119 is adapted to serve as a mixing tool for co-acting with the mixing bowl 110 and for this purpose is shaped to elongated quadrilateral configuration with its major axis extending substantially parallel to the length of the associated stem 121 with two of the four edges 130 and 131 of this tool mutually perpendicular and adapted to engage respectively with the base 111 and cylindrical side wall 115 of the mixing bowl as shown in full outline in Figure 1.

The overall width of this mixing tool 119 is however less than the minimum radial thickness of the annular mixing space 114 so that the mixing tool may be disposed in a position other than that above described; for example as indicated in dotted outline in Figure 1 for the purpose of varying the mixing action in which other positions the tool is spaced away from the outer cylindrical wall of the mixing bowl; such adjustment of the position of the tool being permitted by the pivotal connection provided by the lugs 122, which lugs would engage frictionally with opposite sides of the end of the adjacent stem 121 so as to retain the tool 119 as well as the tool 120 in any desired pivotal position relative to the supporting member 123.

During the mixing operation the mixing bowl 110 is rotated at relatively high speed of approximately 120 R. P. M., by operating the clutch mechanism transmitting the power drive to the shaft 35, so that with the mixing tool 119 disposed within the bowl, mixing of the required ingredients is effected in the known manner.

The tool 120 is adapted to serve for grating, vegetable scraping and like operations and for this purpose is provided with a roughened grating surface 132, which surface is preferably convex about an axis parallel to the length of the stem 121 the tool being of laminar form as in the case of the tool 119 but curved to provide such convex surface instead of being flat as in the case of the tool 119.

The tool 120 is further of elongated rectangular configuration with its major axis parallel to the length of the stem.

Figure 4:
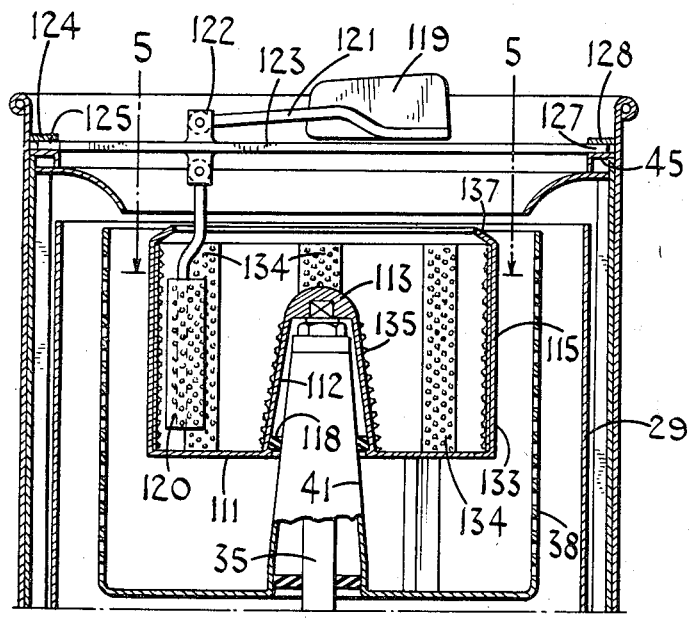
Figure 4 is a cross sectional view of part of the machine depicted in Figure 1 but illustrating an alternative form of bowl in situ.
Figure 5:
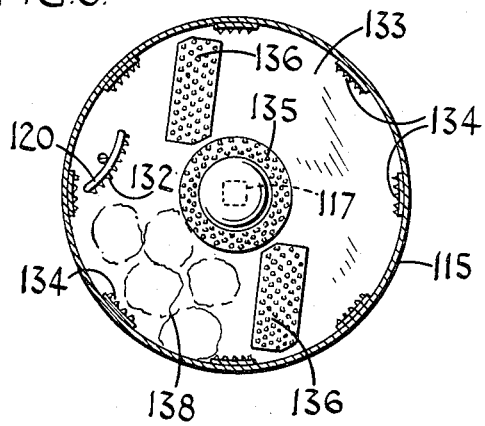
Figure 5 is a sectional view on the line 5—5 of Figure 4.

This tool 120 is adapted to be used with a second bowl 133 depicted in Figures 4 and 5 which bowl constitutes a scraping or grating bowl and is of configuration generally similar to that of the mixing bowl 115 but instead of being perfectly smooth on its interior surface is provided on the inner side of its cylindrical wall 115 with a number of circumferentially spaced vertically extending grating strips 134 provided in the known manner with a grating surface and a similar grating surface is provided on the exterior of the tubular portion 112, as indicated at 135 in these two figures while as shown in Figure 5 further grating strips 136 are provided on the inner surface of the base 111 of this bowl.

The upper edge of the bowl is flanged inwardly at 137 so as to preclude pieces of the grated or shredded material from flying over the upper edge of the bowl and possibly becoming undesirably lodged in the washing machine.

In operation, this grating or scraping bowl would be positioned in like manner to the mixing bowl 110 and in lieu thereof, the supporting member 123 would be inverted from the position depicted in Figure 1 so as to bring the scraping and grating tool 120 within the interior of the bowl 133 but spaced from the interior surface thereof in the manner depicted in Figures 4 and 5 the arrangement being then such that any vegetables for example, which are being cleaned or peeled as depicted at 138 in Figure 5 are engaged between the stationary surface of the scraping or grating tool 120 and the grating surfaces of the rotating bowl 133.

As will be appreciated from the foregoing description, both the two bowls and the two tools for co-operation therewith with their associated supporting member 123 are all of very simple and inexpensive construction so that the present invention provides an appliance for use in the preparation of food-stuffs as above described which is itself inexpensive and which can readily and simply be mounted on a domestic washing machine, without in the particular construction of washing machine illustrated it being necessary to remove any part of the washing machine for this purpose, so that the various parts of the appliance can be mounted in position ready for operation with the utmost dispatch.

The cost of such an appliance is very much smaller than the cost of providing a separate power driven mixing or other food-stuffs preparation machine specifically for such purpose.

Although the invention has been described as applied to one particular form of domestic washing machine as described it will be understood that the appliance may be applied similarly to other washing machines of the type hereinbefore specified.

What we claim then is:

1. In a domestic washing machine of the type comprising a power driven driving element rotatable about a substantially vertical axis within an outer stationary open mouthed casing, the provision of a food mixing attachment comprising the combination of a food-stuffs containing bowl having a driving portion adapted for detachable engagement with said power driven driving element and a tool supporting member with a pair of differently arranged tools mounted on opposite sides of said tool supporting member, means being provided on opposite sides of said casing mouth for mounting said supporting member detachably on said casing in a position in which said tool supporting member extends across said mouth and in two alternative positions in which one or the other of said tools depend from said supporting member into the interior of said bowl to co-act therewith.

2. In a domestic washing machine of the type comprising a power driven driving element rotatable about a substantially vertical axis within an outer stationary open mouthed casing, the provision of a food mixing attachment comprising the combination of a food-stuffs containing bowl having a driving portion adapted for detachable engagement with said power driven driving element with a tool supporting bar, a pair of dissimilar tools hinged about mutually parallel axes perpendicular to the length of said bar at opposite sides thereof, each of said tools being adapted to pivot independently of one another about their respective hinge from an inoperative position in which they lie alongside said bar and an operative position in which they project transversely of the length of said bar, and means on opposite sides of the casing mouth for mounting said tool supporting bar detachably on said casing so that it extends across the mouth of said casing in two alternative positions in which one or the other of said two tools is disposed beneath said bar and to be adapted to project transversely from said bar into the interior of said bowl to co-act therewith.

References Cited in the file of this patent

UNITED STATES PATENTS

| | | |
|---|---|---|
| 1,798,219 | Parker | Mar. 31, 1931 |
| 2,065,353 | Streckfuss | Dec. 22, 1936 |

FOREIGN PATENTS

| | | |
|---|---|---|
| 400,966 | Great Britain | Nov. 3, 1933 |
| 824,331 | Germany | Dec. 10, 1951 |